United States Patent
Ohtsuka et al.

(10) Patent No.: US 9,151,902 B2
(45) Date of Patent: Oct. 6, 2015

(54) WAVELENGTH SELECTIVE SWITCH

(71) Applicant: Sumitomo Electric Industries, Ltd., Osaka-shi (JP)

(72) Inventors: Takafumi Ohtsuka, Yokohama (JP); Hidehisa Tazawa, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 14/260,972

(22) Filed: Apr. 24, 2014

(65) Prior Publication Data

US 2014/0321796 A1  Oct. 30, 2014

(30) Foreign Application Priority Data

Apr. 25, 2013  (JP) ................. 2013-092667

(51) Int. Cl.
*G02B 6/35* (2006.01)
*H04J 14/02* (2006.01)
*G02F 1/31* (2006.01)

(52) U.S. Cl.
CPC ........... *G02B 6/356* (2013.01); *G02F 1/31* (2013.01); *H04J 14/0212* (2013.01); *G02F 2201/305* (2013.01)

(58) Field of Classification Search
None
See application file for complete search history.

(56) References Cited

U.S. PATENT DOCUMENTS

| | | | |
|---|---|---|---|
| 6,867,920 B2 | 3/2005 | Marom | |
| 7,676,126 B2 | 3/2010 | McLaughlin et al. | |
| 8,315,490 B1 | 11/2012 | Yang et al. | |
| 2006/0067611 A1 | 3/2006 | Frisken et al. | |
| 2008/0145053 A1* | 6/2008 | Holmes | ............... 398/79 |
| 2013/0108205 A1 | 5/2013 | Oguri et al. | |

(Continued)

FOREIGN PATENT DOCUMENTS

| | | |
|---|---|---|
| EP | 1 523 212 A2 | 4/2005 |
| JP | 2009-003378 A | 1/2009 |

(Continued)

OTHER PUBLICATIONS

International Search Report and Written Opinion in PCT International Application No. PCT/JP2013/065720, dated Sep. 3, 2013.

(Continued)

*Primary Examiner* — Mike Stahl

(74) *Attorney, Agent, or Firm* — Venable LLP; Michael A. Sartori; F. Brock Riggs

(57) ABSTRACT

A wavelength selective switch includes a light input and output part in which light input/output ports are arranged in a predetermined direction, the light input/output ports including a first port for inputting light, a second port for outputting the light, and at least one third port for inputting or outputting the light, a wavelength dispersive element optically coupled to the light input and output part, and a phase modulation element which includes a plurality of pixels performing phase modulation and diffractively deflects an optical path of the light arriving from the first port via the wavelength dispersive element by presenting a diffraction-grating-shaped phase modulation pattern, and the light input/output ports are arranged so that a $1^{st}$ order light of the light is incident on the second port, and the first port and the third port are spaced from an optical axis of a $-1^{st}$ order light of the light.

7 Claims, 16 Drawing Sheets

(56) References Cited

U.S. PATENT DOCUMENTS

| | | |
|---|---|---|
| 2014/0016079 A1 | 1/2014 | Sakurai |
| 2014/0023316 A1 | 1/2014 | McLaughlin |
| 2014/0037288 A1* | 2/2014 | Matsumoto et al. ............ 398/48 |
| 2014/0355985 A1* | 12/2014 | Chu et al. ........................ 398/49 |

FOREIGN PATENT DOCUMENTS

| | | |
|---|---|---|
| JP | 2012-108346 A | 6/2012 |
| JP | 2012-185312 A | 9/2012 |
| JP | 2013-076891 A | 4/2013 |
| WO | WO-2012/046697 A1 | 4/2012 |
| WO | WO-2012/123715 A1 | 9/2012 |

OTHER PUBLICATIONS

H. Yang et al., "Transient Crosstalk in LCOS Based WSS and a Method to Suppress the Crosstalk Levels," Optical Fiber Communication Conference and Exposition and the National Fiber Optic Engineers Conference (OFC/NFOEC), (2013).

* cited by examiner

WAVELENGTH SELECTIVE SWITCH

BACKGROUND OF THE INVENTION

1. Field of the Invention

One aspect of the present invention relates to a wavelength selective switch.

2. Related Background Art

A device which controls an optical path by independently performing modulation based on a diffraction-grating-shaped phase modulation pattern on each wavelength component using an optical phase matrix device having a grating structure is disclosed in US Patent Application Publication No. 2006/0067611.

A wavelength selective switch includes a wavelength selective switch using a phase modulation element. The phase modulation element is an element including a plurality of pixels arranged in a two-dimensional shape and capable of performing phase modulation in each pixel. In such a wavelength selective switch, a light input/output port which is a coupling destination of each wavelength component is selected by presenting a diffraction-grating-shaped phase pattern to the phase modulation element and controlling a reflection direction of each wavelength component incident on the phase modulation element.

Usually, when light is incident on the diffraction grating, a plurality of light components, such as a zero order light, $\pm 1^{st}$ order light, $\pm 2^{nd}$ order light . . . , are generated. Among them, since a light intensity of the $1^{st}$ order light is highest, the $1^{st}$ order light is coupled to an output port. However, light intensities of other diffracted lights such as the zero order light or the $-1^{st}$ order light may increase depending on the precision of a phase modulation pattern such that the light intensities cannot be neglected. Particularly, the $-1^{st}$ order light is generated at an output angle symmetrical to that of the $1^{st}$ order light. Therefore, the $-1^{st}$ order light is incident on other light input/output ports and causes noise light depending on an arrangement of the light input/output ports.

SUMMARY OF THE INVENTION

One aspect of the present invention has been made in view of such problems, and is intended to provide a wavelength selective switch which can reduce a $-1^{st}$ order light to be incident on light input/output ports.

In order to achieve the above-described object, a wavelength selective switch according to one aspect of the present invention includes a light input and output part in which light input/output ports are arranged in a predetermined direction, the light input/output ports including a first port for inputting light, a second port for outputting the light, and at least one third port for inputting or outputting the light; a wavelength dispersive element optically coupled to the light input and output part; and a phase modulation element which includes a plurality of pixels performing phase modulation and diffractively deflects an optical path of the light arriving from the first port via the wavelength dispersive element by presenting a diffraction-grating-shaped phase modulation pattern, and the light input/output ports are arranged so that a $1^{st}$ order light of the light diffracted by the phase modulation element is incident on the second port, and the first port and the third port are spaced from an optical axis of a $-1^{st}$ order light of the light diffracted by the phase modulation element.

According to the wavelength selective switch according to one aspect of the present invention, it is possible to reduce the $-1^{st}$ order light to be incident on the light input/output ports.

DETAILED DESCRIPTION

Description of Embodiments

Figure 1:
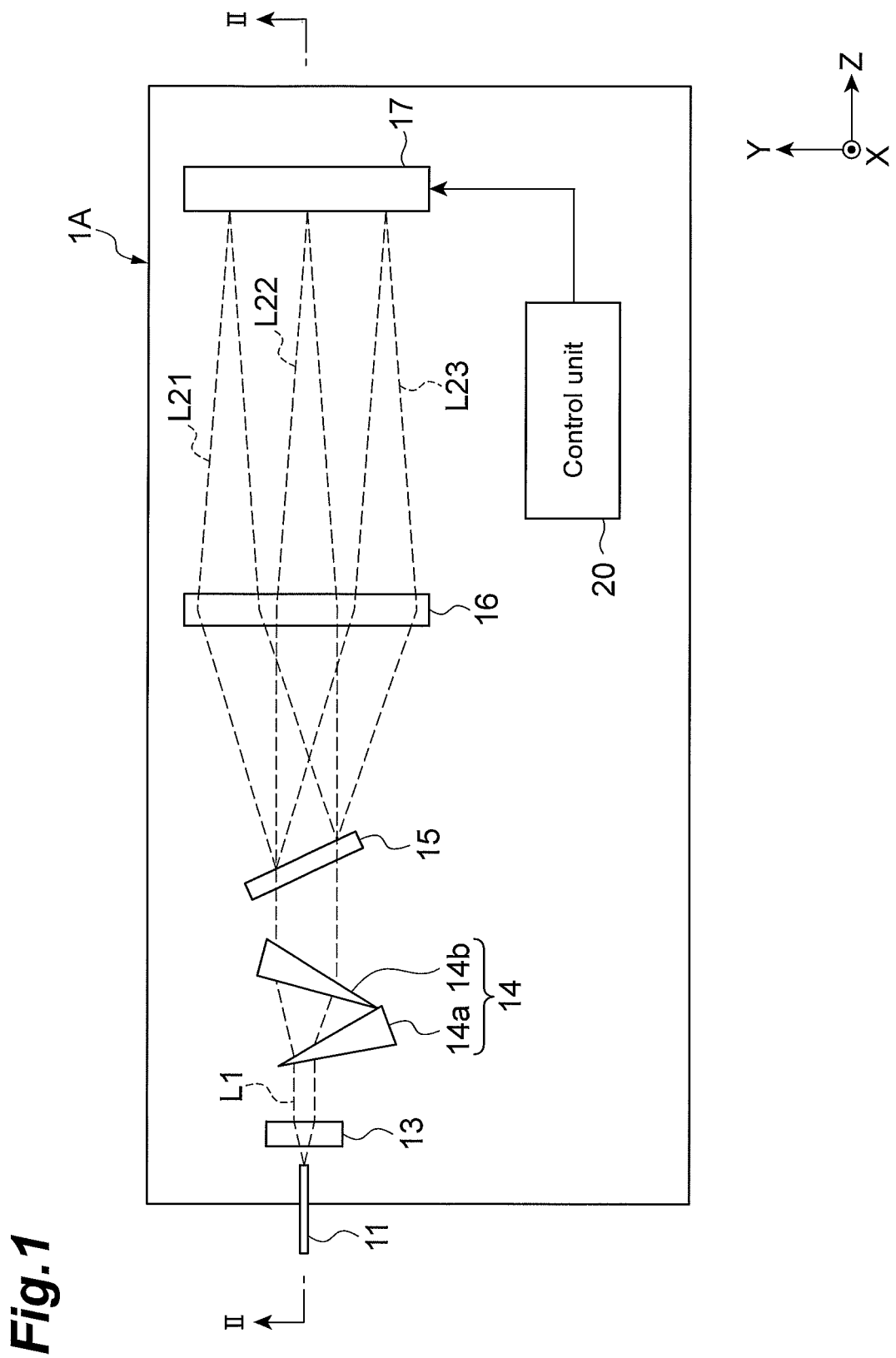
FIG. 1 is a plan view schematically illustrating a configuration of a wavelength selective switch in one embodiment.

First, one embodiment of a wavelength selective switch according to one aspect of the present invention will be described.

A wavelength selective switch according to one embodiment includes a light input and output part in which light input/output ports are arranged in a predetermined direction, the light input/output ports including a first port for inputting light, a second port for outputting the light, and at least one third port for inputting or outputting the light; a wavelength dispersive element optically coupled to the light input and output part; and a phase modulation element which includes a plurality of pixels performing phase modulation and diffractively deflects an optical path of the light arriving from the first port via the wavelength dispersive element by presenting a diffraction-grating-shaped phase modulation pattern, wherein the light input/output ports are arranged so that a $1^{st}$ order light of the light diffracted by the phase modulation element is incident on the second port, and the first port and the third port are spaced from an optical axis of a $-1^{st}$ order light of the light diffracted by the phase modulation element.

Further, in the wavelength selective switch according to one embodiment, one portion of the light input/output ports and a remaining portion of the light input/output ports may be arranged with the optical axis of a zero order light of the light diffracted by the phase modulation element interposed therebetween, and the one portion and the remaining portion may be arranged to be asymmetrical to each other with respect to the optical axis of the zero order light.

Further, in the wavelength selective switch according to one embodiment, one portion of the light input/output ports and a remaining portion of the light input/output ports may be arranged with the optical axis of a zero order light of the light diffracted by the phase modulation element interposed therebetween, and the light input/output ports of the remaining portion may be uniformly spaced from positions symmetrical to the one portion with respect to the optical axis of the zero order light.

Further, in the wavelength selective switch according to one embodiment, a ratio of distances between an optical axis of a zero order light of the light diffracted by the phase modulation element and the respective light input/output ports may be relatively prime.

Further, in the wavelength selective switch according to one embodiment, a port distance of the light input/output port may increase or decrease as a distance from the optical axis of a zero order light of the light diffracted by the phase modulation element increases.

Further, in the wavelength selective switch according to one embodiment, an optical axis of the light arriving via the wavelength dispersive element may be inclined with respect to a normal of the phase modulation element, and a position of the optical axis of the $-1^{st}$ order light may be determined by additionally using a position shift amount of the optical axis of the zero order light due to the inclination.

Further, the wavelength selective switch according to one embodiment may further include a condensing lens arranged on an optical path between the wavelength dispersive element and the phase modulation element to condense the light passing through the wavelength dispersive element toward the phase modulation element, wherein one portion of the light input/output ports and a remaining portion of the light input/output ports may be arranged with the optical axis of the zero order light of the light diffracted by the phase modulation element interposed therebetween, and when an incident angle of the light arriving via the wavelength dispersive element with respect to the phase modulation element is α and a distance between the condensing lens and the phase modulation element is L, the light input/output ports of the remaining portion may be spaced by L sin α from positions symmetrical to the one portion with respect to the optical axis of the zero order light.

Further, the wavelength selective switch according to one embodiment may further include a condensing lens arranged on an optical path between the wavelength dispersive element and the phase modulation element to condense the light passing through the wavelength dispersive element toward the phase modulation element, wherein, when an incident angle of the light arriving via the wavelength dispersive element with respect to the phase modulation element is α and a distance between the condensing lens and the phase modulation element is L, a distance between the central axis of the third port closest to the optical axis of the zero order light and the optical axis of the zero order light may be substantially equal to L sin α.

Further, in the wavelength selective switch according to one embodiment, an isolator may be provided in the first port or a phase modulation pattern for cancelling the zero order light of the light diffracted by the phase modulation element may be further presented on the diffraction-grating-shaped phase modulation pattern.

Further, in the wavelength selective switch according to one embodiment, a relative light intensity of the $-1^{st}$ order light incident on the third port relative to a light intensity of the $1^{st}$ order light incident on the second port may be less than −30 dB.

DETAILED DESCRIPTION OF EMBODIMENTS

Hereinafter, one embodiment of the wavelength selective switch according to one aspect of the present invention will be described in detail with reference to the accompanying drawings. Further, the same elements in the description of the drawings are denoted with the same reference signs, and a repeated description is omitted. Further, one aspect of the present invention is not limited to the following illustrations. One aspect of the present invention is shown by the claims, and all changes within the meaning and scope equivalent to the claims are intended to be included.

Figure 2:
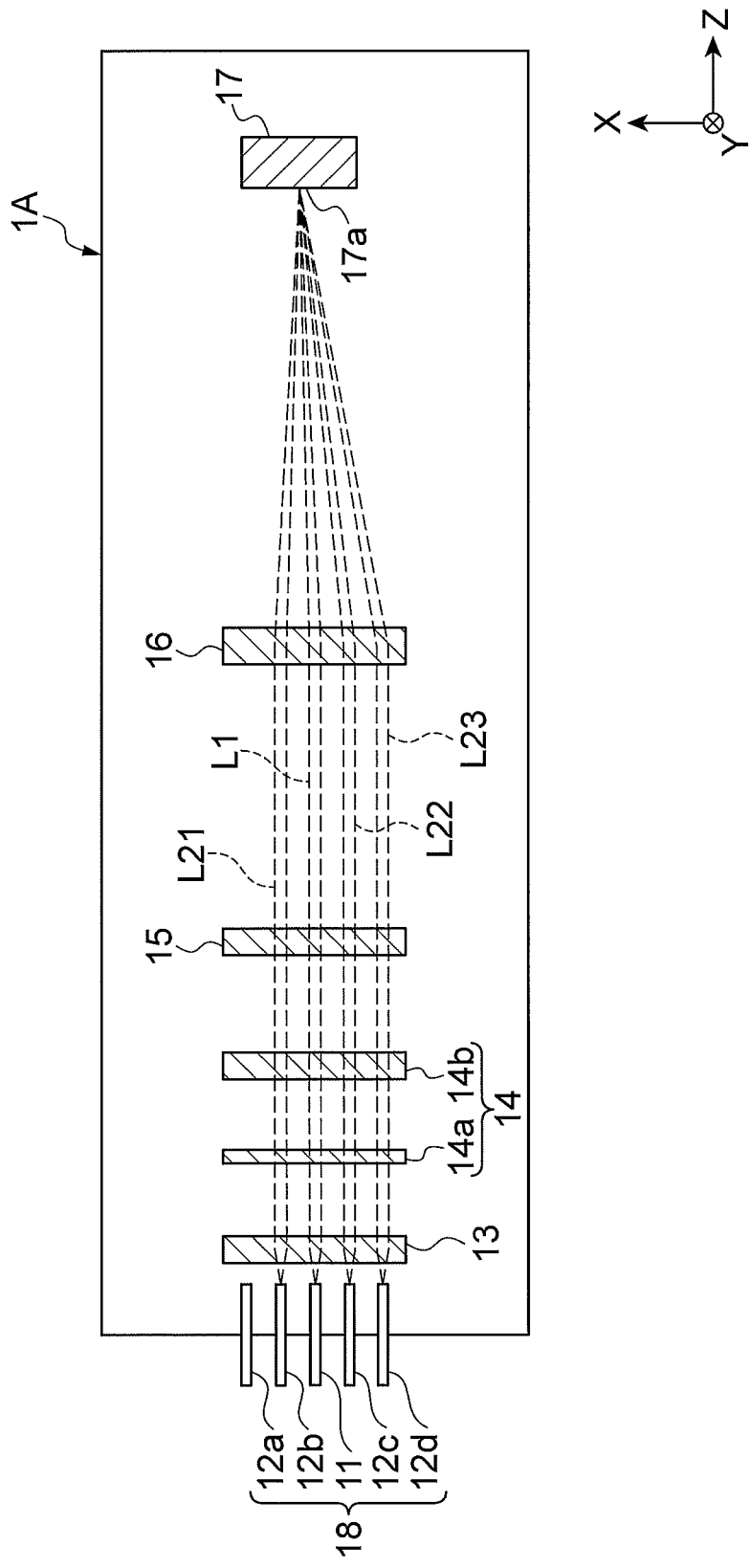
FIG. 2 is a side cross-sectional view taken along a line II-II of the wavelength selective switch illustrated in FIG. 1.

FIG. 1 is a plan view schematically illustrating a configuration of a wavelength selective switch 1A in one embodiment. Further, FIG. 2 is a side cross-sectional view taken along a line II-II of the wavelength selective switch 1A illustrated in FIG. 1. Further, an XYZ orthogonal coordinate system is illustrated in FIGS. 1 and 2 for ease of understanding. The wavelength selective switch 1A has a substantially rectangular parallelepiped shape having a top surface and a bottom surface along a YZ plane, and four side surfaces in an X-axis direction.

This wavelength selective switch 1A includes a light input and output part 18 including an input port 11 and a plurality of output ports 12a to 12d, as illustrated in FIGS. 1 and 2. Light including a plurality of wavelength components (e.g., signal light in a wavelength multiplexing optical communication) L1 is input from the outside of the wavelength selective switch 1A to the input port 11. In this embodiment, the wavelength selective switch 1A disperses the light L1 input to the input port 11 into wavelength components and outputs respective wavelength components from the plurality of respective output ports 12a to 12d. Further, three wavelength components L21, L22 and L23 and four output ports 12a to 12d are illustrated by way of example in FIG. 1. Also, the three wavelength components L21, L22 and L23 are output from the three output ports 12b, 12c and 12d among the four output ports 12a to 12d, respectively. Further, in the following description, the input port 11 and the plurality of output ports 12a to 12d may be referred to as a light input/output port.

The plurality of output ports 12a to 12d are arranged side by side in a predetermined direction (e.g., an X-axis direction). In this embodiment, the input port 11 and the plurality of output ports 12a to 12d are arranged side by side in a row in the X-axis direction. Further, in the following description, the X-axis direction may be referred to as a port arrangement direction. Here, FIG. 3 is a diagram illustrating an example of an arrangement of the light input/output port constituting the light input and output part 18 and illustrates a state in which the light input/output port is viewed from a Z-axis direction.

Figure 3:
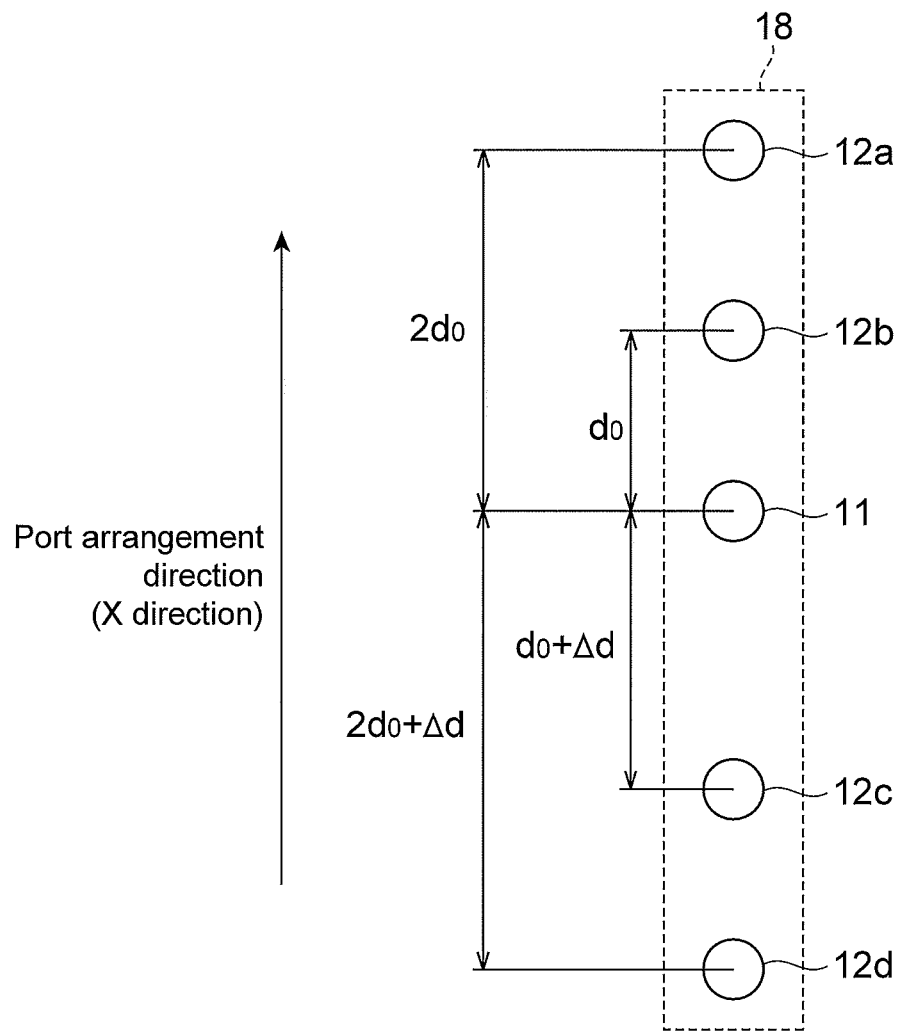
FIG. 3 is a diagram illustrating an example of an arrangement of a light input/output port.

In this embodiment, the input port 11 is arranged at a center of the light input/output port, as illustrated in FIG. 3. Further, one portion of the output ports 12a and 12b of the plurality of output ports 12a to 12d are arranged on one side in the port arrangement direction with respect to the input port 11. Further, a remaining portion of the output ports 12c and 12d of the plurality of output ports 12a to 12d are arranged on the other side in the port arrangement direction with respect to the input port 11. Further, the input port 11 and the plurality of output ports 12a to 12d preferably include, for example, optical waveguide members such as optical fibers.

Further, in the light input and output part 18 of this embodiment, a distance between the input port 11 and the output port 12a (a distance between central line axes) is $2d_0$ based on a distance $d_0$ between the input port 11 and the output port 12b, as will be described below. Further, a distance between the input port 11 and the output port 12c is $d_0+\Delta d$. Further, a distance between the input port 11 and the output port 12d is $2d_0+\Delta d$. In other words, positions of the output ports 12c and 12d based on the input port 11 are offset by $\Delta d$ from positions symmetrical to the output ports 12a and 12b. A reason for this will be described below.

FIGS. 1 and 2 will be referred to again. The wavelength selective switch 1A further includes a collimator lens 13, an anamorphic optical system 14, a wavelength dispersive element 15, a condensing lens 16, a phase modulation element 17, and a control unit 20.

The collimator lens 13 is optically coupled to the input port 11, and collimates the light L1 input from the input port 11. Further, the collimator lens 13 is optically coupled to the plurality of output ports 12a to 12d and condenses the respective wavelength components L21 to L23 after dispersion toward the corresponding output ports (e.g., 12b to 12d).

The anamorphic optical system 14 receives the light L1 via the collimator lens 13, and converts a section of the light L1 perpendicular to an optical axis into a flat shape extending in a direction (e.g., a Y-axis direction, which may be referred hereinafter to as a dispersion direction) intersecting the above-described predetermined direction (in this embodiment, the X-axis direction). In this embodiment, the anamorphic optical system 14 preferably includes prisms 14a and 14b and expands a width of the light L1 in the Y-axis direction. Thus, the section of the light L1 perpendicular to the optical axis has the flat shape extending in the Y-axis direction. Further, one surface of the anamorphic optical system 14 is optically coupled to the plurality of output ports 12a to 12d via the collimator lens 13. Further, the other surface of the anamorphic optical system 14 is optically coupled to a modulation surface 17a of the phase modulation element 17 which will be described below. The anamorphic optical system 14 reduces the widths in the Y-axis direction of the respective wavelength components L21 to L23 reflected from the modulation surface 17a toward the corresponding output ports (e.g., the output ports 12b to 12d). Such an anamorphic optical system 14 may include one or a plurality of optical components having optical power only in one of the X-axis direction and the Y-axis direction (e.g., cylindrical lenses). Further, the anamorphic optical system 14 may be configured to expand the width of the light L1 in the Y-axis direction or may be configured to reduce the width of the light L1 in the X-axis direction.

The wavelength dispersive element 15 receives the light L1 input from the input port 11 and disperses the light L1 into the respective wavelength components L21 to L23. The wavelength dispersive element 15 of this embodiment receives the light L1 via the collimator lens 13 and the anamorphic optical system 14. The wavelength dispersive element 15 preferably includes, for example, a plate-shape member having a diffraction grating formed on its surface. The respective wavelength components L21 to L23 of the light L1 dispersed by the wavelength dispersive element 15 advance in different optical axis directions. In this embodiment, the respective wavelength components L21 to L23 are dispersed in the dispersion direction (Y-axis direction) described above.

The condensing lens 16 optically couples the wavelength dispersive element 15 and the phase modulation element 17, and is arranged on an optical path between the wavelength dispersive element 15 and the phase modulation element 17. The condensing lens 16 condenses the respective wavelength components L21 to L23 passing through the wavelength dispersive element 15 toward the modulation surface 17a of the phase modulation element 17. In this case, the light of the flat shape extending in the Y-axis direction is converted into light of the flat shape extending in the X-axis direction on the modulation surface 17a. Further, the condensing lens 16 collimates the respective wavelength components L21 to L23 reflected by the modulation surface 17a toward the wavelength dispersive element 15.

The phase modulation element 17 includes a plurality of pixels which perform phase modulation. The phase modulation element 17 diffractively deflects an optical path of the light L1 arriving from the input port 11 via the wavelength dispersive element 15, that is, the wavelength components L21 to L23 in an XZ plane by presenting a diffraction-grating-shaped phase modulation pattern. Further, in the following description, the X-axis direction may be referred to as a deflection direction. A deflection angle (a reflection angle) in the XZ plane in this time is different among the respective wavelength components L21 to L23, and is set so that the respective wavelength components L21 to L23 are incident on desired output ports (e.g., the output ports 12b to 12d).

Figure 4:
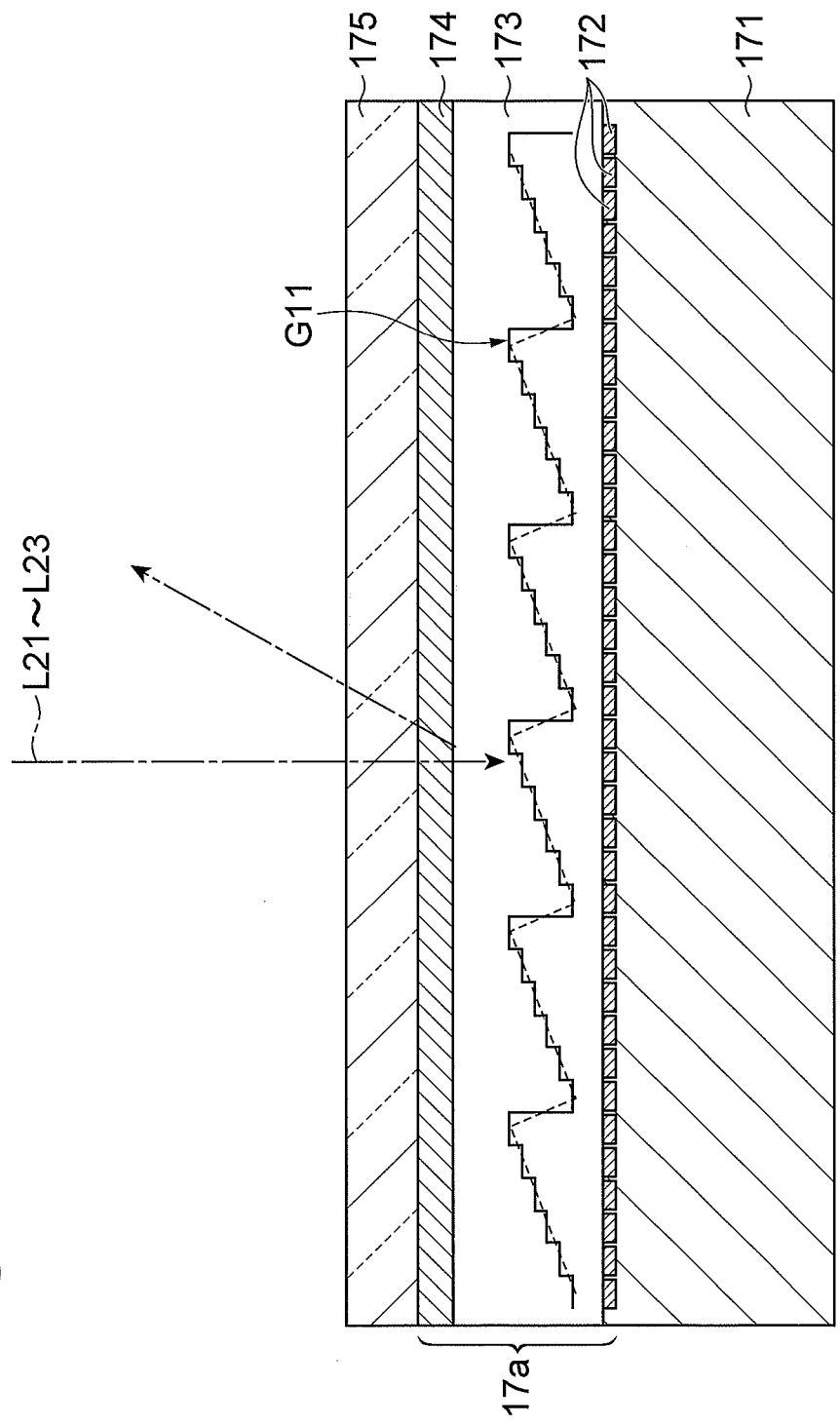
FIG. 4 is a cross-sectional view illustrating a configuration of an LCOS type of phase modulation element as a specific configuration example of a phase modulation element.

Here, FIG. 4 is a cross-sectional view illustrating a configuration of an LCOS (Liquid Crystal On Silicon) in a specific configuration example of the phase modulation element 17. The phase modulation element 17 includes a silicon substrate 171, and a plurality of pixel electrodes 172 provided on a main surface of the silicon substrate 171, as illustrated in FIG. 4. The plurality of pixel electrodes 172 two-dimensionally are arranged along the main surface of the silicon substrate 171. Further, a liquid crystal layer 173, a transparent electrode 174 and a cover glass 175 are sequentially arranged on the main surface of the silicon substrate 171. Also, phases of the wavelength components L21 to L23 incident on the liquid crystal layer 173 are modulated according to a magnitude of an electric field formed between the transparent electrode 174 and the plurality of pixel electrodes 172. An amount of this phase modulation is different among the respective pixels as the electric fields having a different magnitude are formed in the respective pixel electrodes 172. Further, the modulation surface 17a described above mainly includes the plurality of pixel electrodes 172, the liquid crystal layer 173 and the transparent electrode 174. Further, in FIG. 4, amounts of phase modulation of the respective pixels when the diffraction-grating-shaped phase modulation pattern is presented in the modulation surface 17a are conceptually illustrated as a graph G11.

Figure 5:
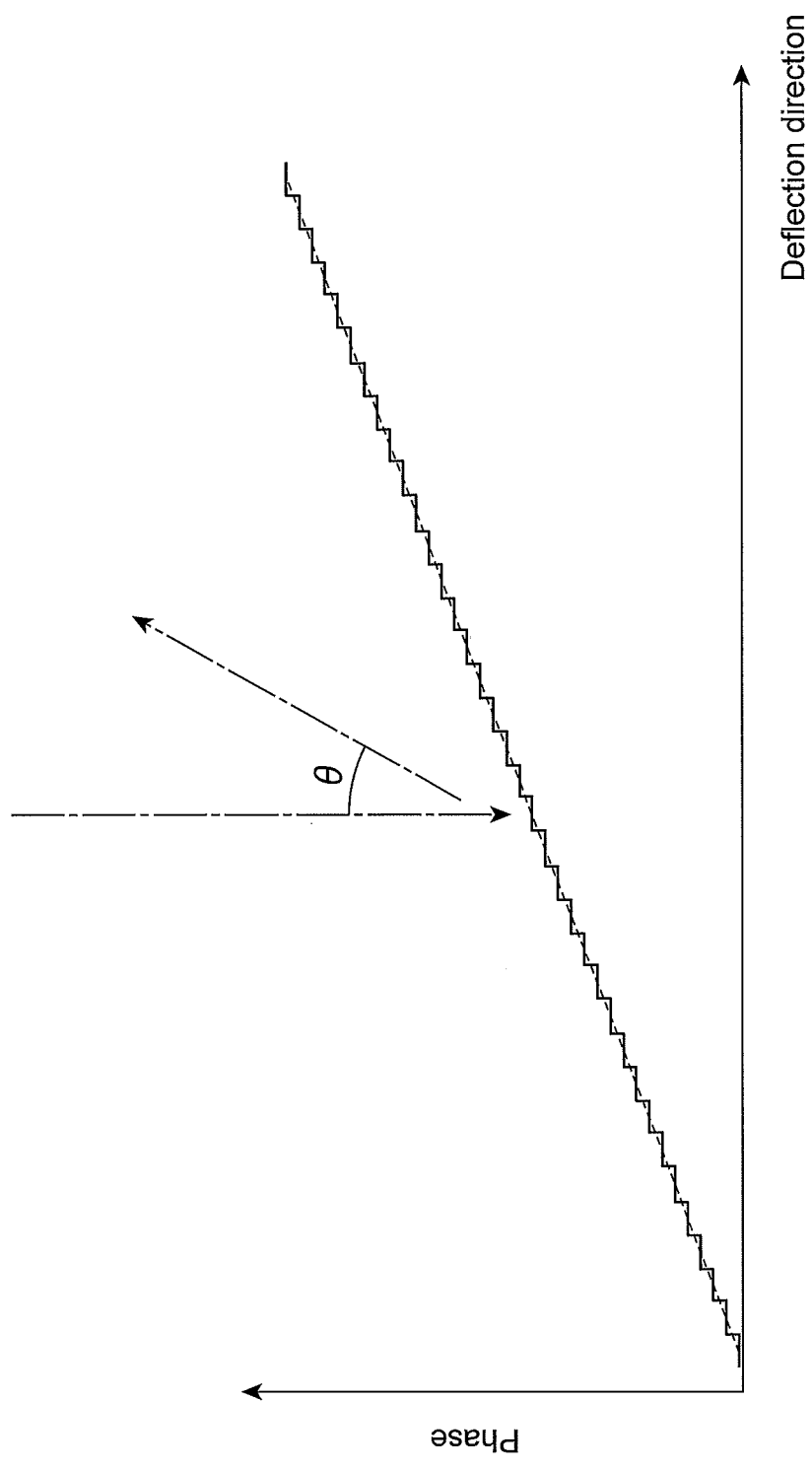
FIG. 5 is a graph illustrating a substantial change of the amount of phase modulation in a deflection direction when a diffraction-grating-shaped phase modulation pattern is presented by a modulation surface.

FIG. 5 is a graph illustrating a substantial change of the amount of phase modulation in the deflection direction when the diffraction-grating-shaped phase modulation pattern has been presented in the modulation surface 17a. In the modulation surface 17a, when the amount of phase modulation increases in a stepwise manner between 0 (rad) and $2\pi$ (rad) and reaches $2\pi$ (rad), the amount of phase modulation is returned to 0 (rad) again and increases in a stepwise manner between 0 (rad) and 2π (rad), as conceptually illustrated in FIG. 4 described above. With such a phase modulation pattern, the diffraction-grating-shaped phase modulation pattern monotonically increasing in a stepwise manner illustrated in FIG. 5 is substantially realized. Also, when each wavelength component L21 (L22 or L23) is incident on the modulation surface 17a in which such a phase modulation pattern has been presented, each wavelength component L21 (L22 or L23) is deflected with an output angle θ according to a period of the diffraction grating.

Figure 6:
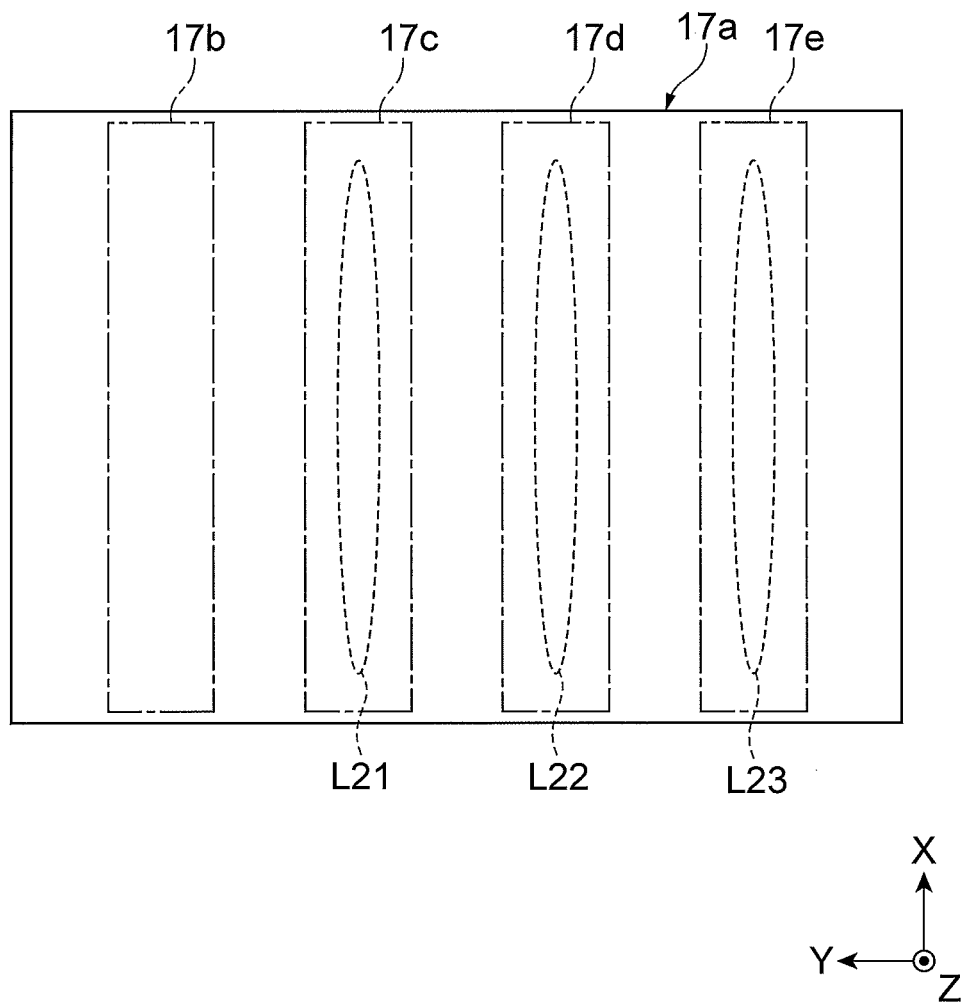
FIG. 6 is a diagram illustrating a state in which a modulation surface is viewed from a normal direction (a light incidence direction).

FIG. 6 is a diagram illustrating a state in which the modulation surface 17a is viewed from a normal direction (light incidence direction). The modulation surface 17a includes a plurality of phase modulation areas 17b to 17e arranged in the Y-axis direction (dispersion direction). The wavelength components L21 to L23 are selectively incident on the phase modulation areas 17b to 17e. In the example illustrated in FIG. 6, the wavelength components L21 to L23 are incident on the phase modulation areas 17c, 17d and 17e, respectively. Also, the phase modulation areas 17c to 17e deflect the wavelength components L21 to L23 to the corresponding output ports 12b to 12d by presenting the diffraction-grating-shaped phase modulation pattern having different periods. The respective wavelength components L21 to L23 deflected by the phase modulation element 17 in this way are collimated by the condensing lens 16, and then arrive at the corresponding output ports 12b to 12d via the anamorphic optical system 14 and the collimator lens 13.

Figure 7A:
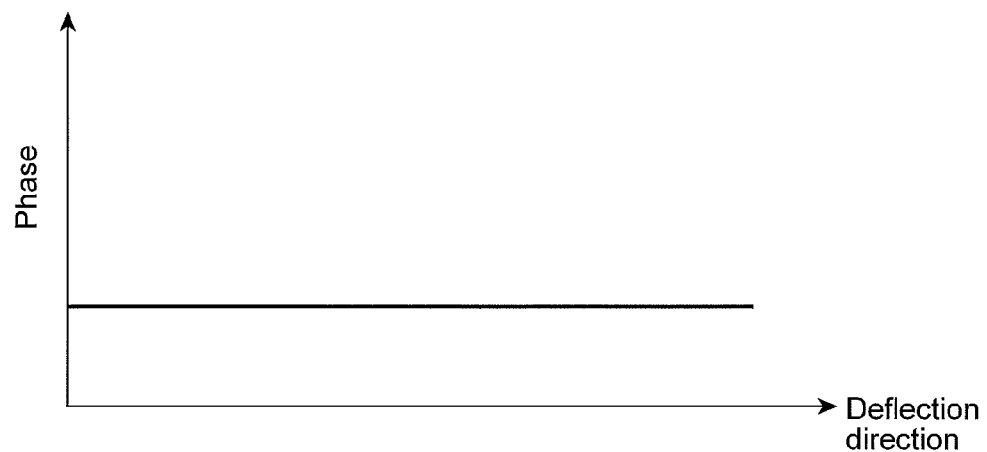
FIG. 7A is a diagram illustrating a phase modulation pattern of a modulation surface in a deflection direction.
Figure 7B:
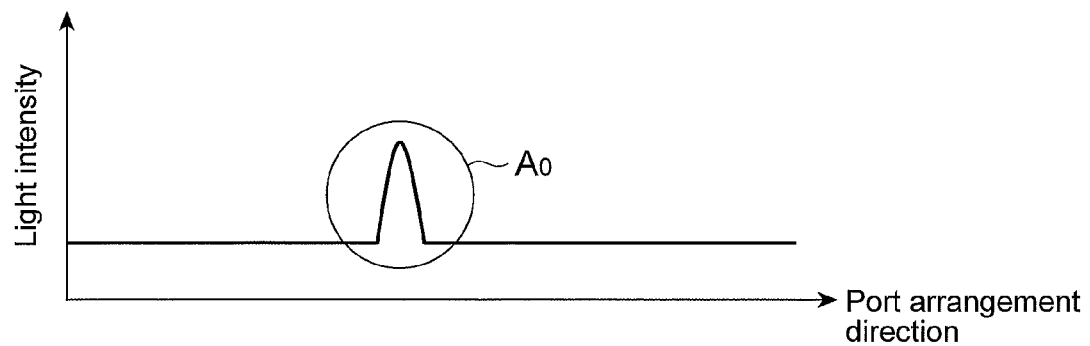
FIG. 7B is a graph illustrating a light intensity distribution of a diffractively deflected light arriving at a light input and output part in a port arrangement direction in the case of FIG. 7A.
Figure 8A:
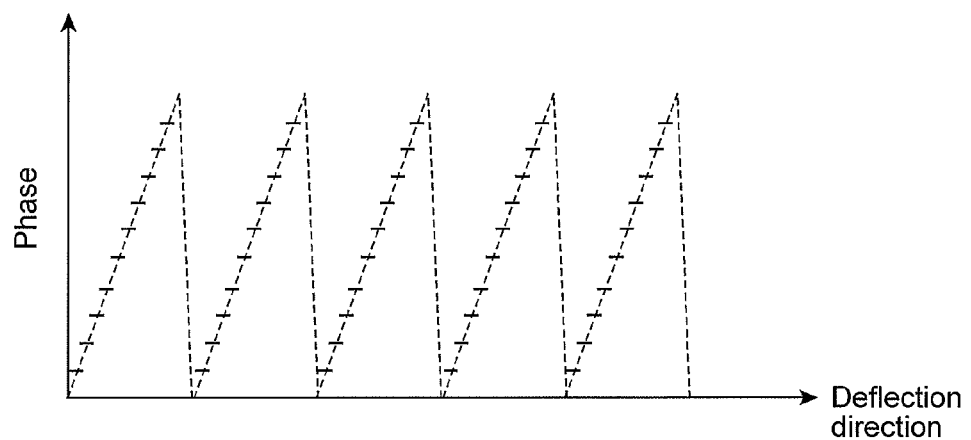
FIG. 8A is a diagram illustrating a phase modulation pattern of the modulation surface in the deflection direction.
Figure 8B:
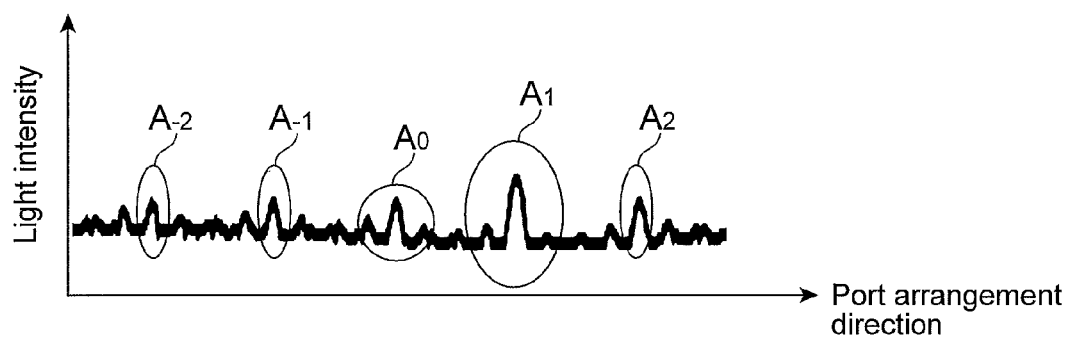
FIG. 8B is a graph illustrating a light intensity distribution of a diffractively deflected light arriving at a light input and output part in a port arrangement direction in the case of FIG. 8A.

FIGS. 7A and 8A illustrate a phase modulation pattern of the modulation surface 17a in the deflection direction. Further, FIGS. 7B and 8B are graphs indicating a light intensity distribution of the diffractively deflected light that has arrived at the light input and output part 18 in the port arrangement direction, in the case of FIGS. 7A and 8A. When the phase modulation pattern in which the amount of phase modulation presented in the deflection direction by the modulation surface 17a is constant as illustrated in FIG. 7A, only a zero order light $A_0$ arrives at the light input and output part 18 as illustrated in FIG. 7B. On the other hand, when the diffraction-grating-shaped phase modulation is presented in the deflection direction by the modulation surface 17a as illustrated in FIG. 8A, a light intensity of the zero order light $A_0$ decreases and a light intensity of an adjacent $1^{st}$ order light $A_1$ increases as illustrated in FIG. 8B. Therefore, the period of the diffraction grating of the phase modulation areas 17c to 17e illustrated in FIG. 6 is set so that the $1^{st}$ order light of the wavelength components L21 to L23 incident on the modulation surface 17a is incident on the respective output ports 12b to 12d.

Further, a plurality of lights such as higher order lights such as a $2^{nd}$ order light $A_2$ or a $3^{rd}$ order light and negative higher order lights such as a $-1^{st}$ order light $A_{-1}$, a $-2^{nd}$ order light $A_{-2}$ or a $-3^{rd}$ order light, as well as the $1^{st}$ order light $A_1$, arrive at the light input and output part 18, as illustrated in FIG. 8B. It is preferable that the lights other than the $1^{st}$ order light are not incident on the output port 12b (12c or 12d) which is an incidence target of the wavelength component L21 (L22 or L23) and other light input/output ports as possible. This is because noise light is caused when the light other than the $1^{st}$ order light is incident on the other light input/output port, as described above. In the following description, an input port for inputting light from the outside may be referred to as a first port, a desired output port for the $1^{st}$ order light A1 may be referred to as a second port, and ports other than the first port and the second port may be referred to as a third port.

Figure 9:
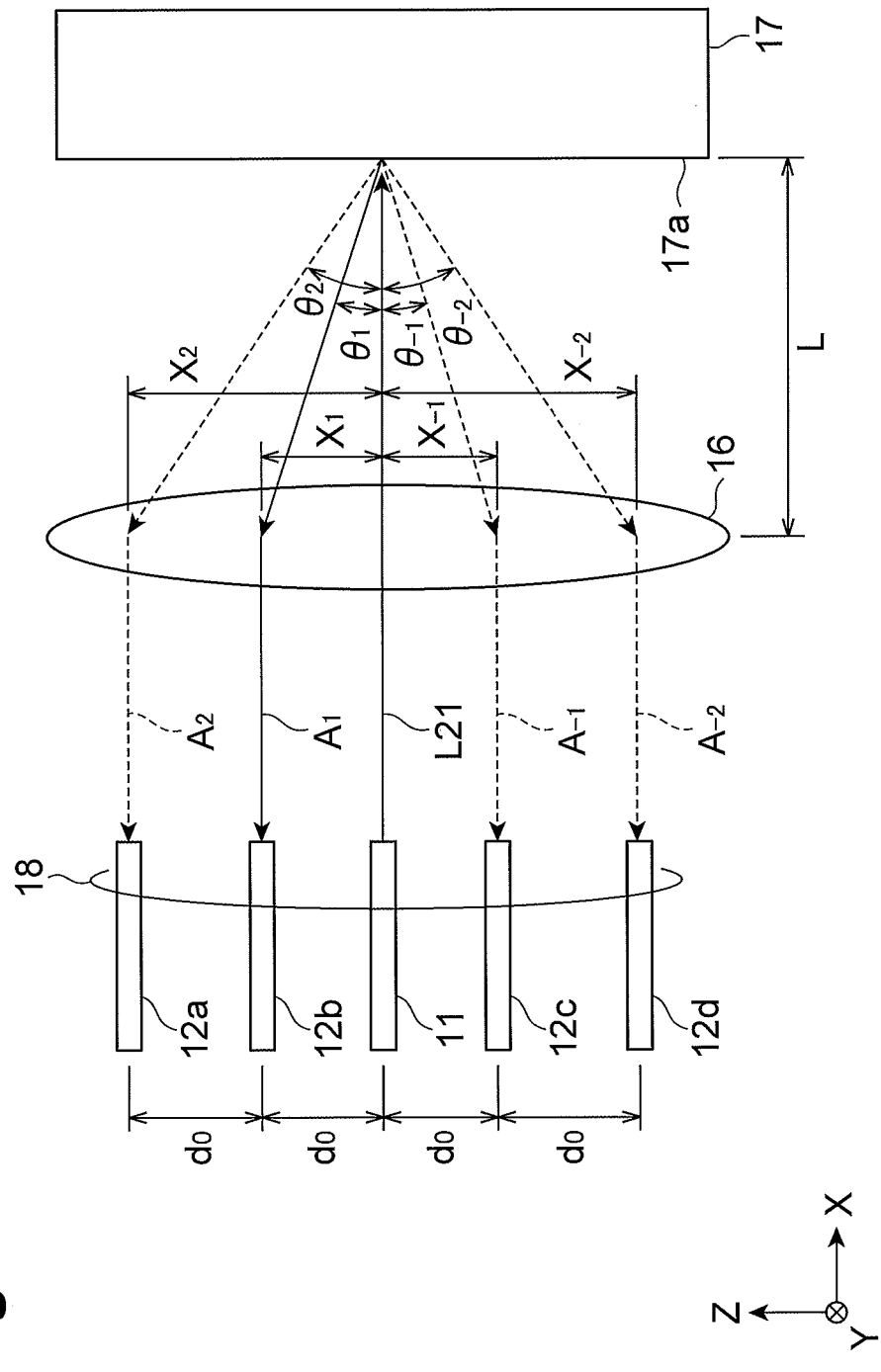
FIG. 9 is a diagram schematically illustrating a port arrangement in the wavelength selective switch in a comparative example.

Here, FIG. 9 is a diagram schematically illustrating a light input and output part 18 in a wavelength selective switch in a comparative example. In the wavelength selective switch of the comparative example, an input port 11 and output ports 12a to 12d are arranged at equal distances (distances $d_0$), as illustrated in FIG. 9. In such a configuration, a case in which a wavelength component L21 is incident on the output port 12b is considered. A $1^{st}$ order light $A_1$ among diffracted lights of the wavelength component L21 output from a modulation surface 17a of a phase modulation element 17 is incident on the output port 12b (i.e., a second port), as described above. Also, in this case, a $-1^{st}$ order light $A_{-1}$, a $2^{nd}$ order light $A_2$ and a $-2^{nd}$ order light $A_{-2}$ are generated.

Here, when a distance between a center of a condensing lens 16 and the modulation surface 17a is L and an inclination angle (an output angle) of an $n^{th}$ order light (n is an integer) with respect to an optical axis of the condensing lens 16 is $θ_n$, a position coordinate $x_n$ of a passage point of the $n^{th}$ order light $A_n$ in the condensing lens 16 with respect to a central axis of the condensing lens 16 is expressed as:

$$x_n = L \cdot \sin(θ_n) \quad (1)$$

Further, the inclination angle $θ_n$ of the $n^{th}$ order light $A_n$ is n times an inclination angle $θ_1$ of the $1^{st}$ order light $A_1$ (i.e., $θ_n = n \cdot θ_1$). Here, since the inclination angle $θ_n$ is a very small angle, Equation (1) above is approximated to:

$$x_n = L \cdot \sin(θ_n) = L \cdot \sin(n \cdot θ_1) \approx nL \cdot \sin(θ_1) \quad (2)$$

That is, the position coordinate $x_n$ is n times a position coordinate $x_1$ of a passage point of the $1^{st}$ order light $A_1$ in the condensing lens 16. In other words, passage points of the respective orders of lights in the condensing lens 16 are at equal distances. Also, since these distances are maintained up to the light input and output part 18, arrival positions of the respective orders of lights arriving at the light input and output part 18 are at equal distances, as illustrated in FIG. 9. From this, if the input port 11 and the output ports 12a to 12d are arranged at equal distances (distances $d_0$) and the $1^{st}$ order light $A_1$ is incident on the output port 12b, the $-1^{st}$ order light $A_{-1}$ is incident on the output port 12c, the $2^{nd}$ order light $A_2$ is incident on the output port 12a, and the $-2^{nd}$ order light $A_{-2}$ is incident on the output port 12d.

Particularly, the $-1^{st}$ order light $A_{-1}$ is generated at an output angle symmetrical to that of the $1^{st}$ order light $A_1$. Therefore, for example, when the output ports are arranged on both sides of the input port 11 as in this embodiment, the $-1^{st}$ order light $A_{-1}$ is necessarily incident on the output port present in a position symmetrical to the desired output port on which the $1^{st}$ order light $A_1$ is incident. Further, when the inclination angle $θ_1$ of the $1^{st}$ order light $A_1$ is great, optical axes of the $2^{nd}$ order light $A_2$ and the $-2^{nd}$ order light $A_{-2}$ may deviate from the light input and output part 18. However, in this case, there is a problem in which a phase difference between the pixels of the phase modulation pattern increases, and thus precision of the diffraction-grating-shaped pattern decreases and a light intensity of the $-1^{st}$ order light $A_{-1}$ further increases.

Figure 10:
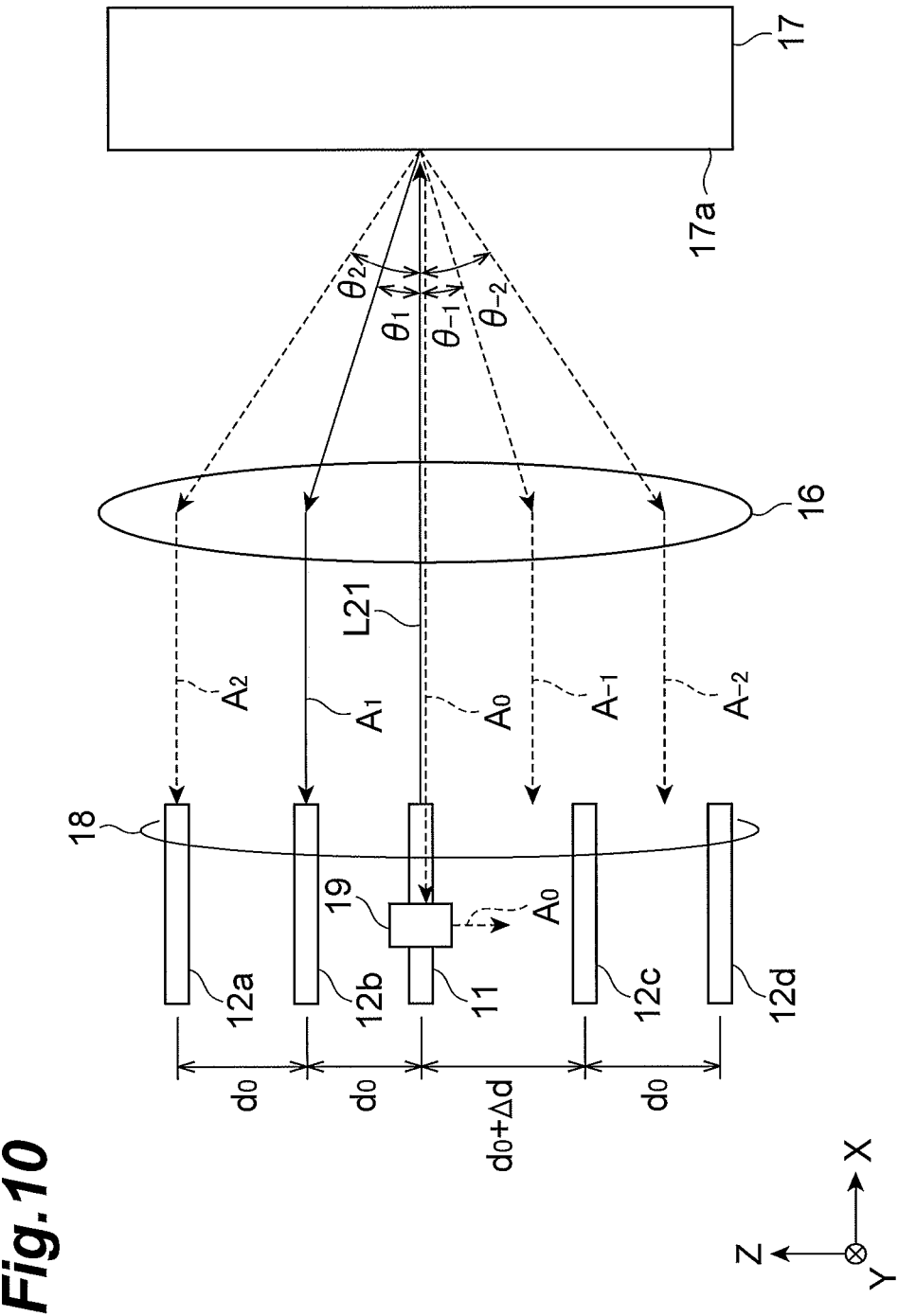
FIG. 10 is a diagram illustrating a relative arrangement of an input port and a plurality of output ports.

Therefore, in this embodiment, a relative arrangement of the input port 11 and the output ports 12a to 12d is set as illustrated in FIG. 10. First, the relative arrangement of the input port 11 and the output port 12b is set so that the output port 12b is arranged on the optical axis of the $1^{st}$ order light $A_1$. Accordingly, the $1^{st}$ order light $A_1$ is incident on the output port 12b. On the other hand, the relative arrangement of the input port 11 and the plurality of output ports 12a, 12c and 12d is set so that the other output ports 12a, 12c and 12d (i.e., a third port) other than the output port 12b are spaced from an optical axis of the $-1^{st}$ order light $A_{-1}$. Accordingly, it is possible to prevent the $-1^{st}$ order light $A_{-1}$ from being incident on the other output ports 12a, 12c and 12d (the third port) or to reduce an incident light amount of the $-1^{st}$ order light $A_{-1}$ on the other output port 12a, 12c and 12d (the third port).

Here, the output ports 12a, 12c and 12d (the third port) and the optical axis of the $-1^{st}$ order light $A_{-1}$ being spaced from each other refers to the fact that the output ports 12a, 12c and 12d and the optical axis of the $-1^{st}$ order light $A_{-1}$ are spaced so that the light intensity of the $-1^{st}$ order light $A_{-1}$ incident on the output ports 12a, 12c and 12d (the third port) is less than, for example, −30 dB based on the light intensity (a maximum coupling intensity) of the $1^{st}$ order light $A_1$ incident on the output port 12b (the second port). If the light intensity of the $-1^{st}$ order light $A_{-1}$ is less than −30 dB based on the light intensity of the $1^{st}$ order light $A_1$, it is possible to sufficiently suppress an influence on optical communication.

Further, while the wavelength component L21 has been described above by way of example, the same applies to the wavelength components L22 and L23. In other words, for the wavelength component L22, the relative arrangement of the input port 11 and the plurality of output ports 12a, 12b and 12d is set so that the other output ports 12a, 12b and 12d (the third port) other than the desired output port 12c (the second port) are spaced from the optical axis of the $-1^{st}$ order light $A_{-1}$ of the wavelength component L22. Further, for the wavelength component L23, the relative arrangement of the input port 11 and the plurality of output ports 12a to 12c is set so that the other output ports 12a to 12c (the third port) other than the desired output port 12d (the second port) are spaced from the optical axis of the $-1^{st}$ order light $A_{-1}$ of the wavelength component L23.

In one embodiment, the one portion of the light input and output part 18 (the output ports 12a and 12b) and the remaining portion of the light input and output part 18 (the output ports 12c and 12d) arranged with the optical axis of the zero order light $A_0$ interposed therebetween may be arranged to be asymmetrical to each other with respect to the optical axis of the zero order light $A_0$. Accordingly, it is possible to preferably prevent the $-1^{st}$ order light $A_{-1}$ from being incident on the output port (the third port) other than the desired output port (the second port). Such a form is preferably realized in such a manner that the light input/output ports of the remaining portion of the light input and output part 18 (the output ports 12c and 12d) are uniformly spaced by a distance $\Delta d$ from positions symmetrical to the one portion of the light input and output part 18 (the output ports 12a and 12b) with respect to the optical axis of the zero order light $A_0$, for example, as illustrated in FIG. 10.

Figure 11:
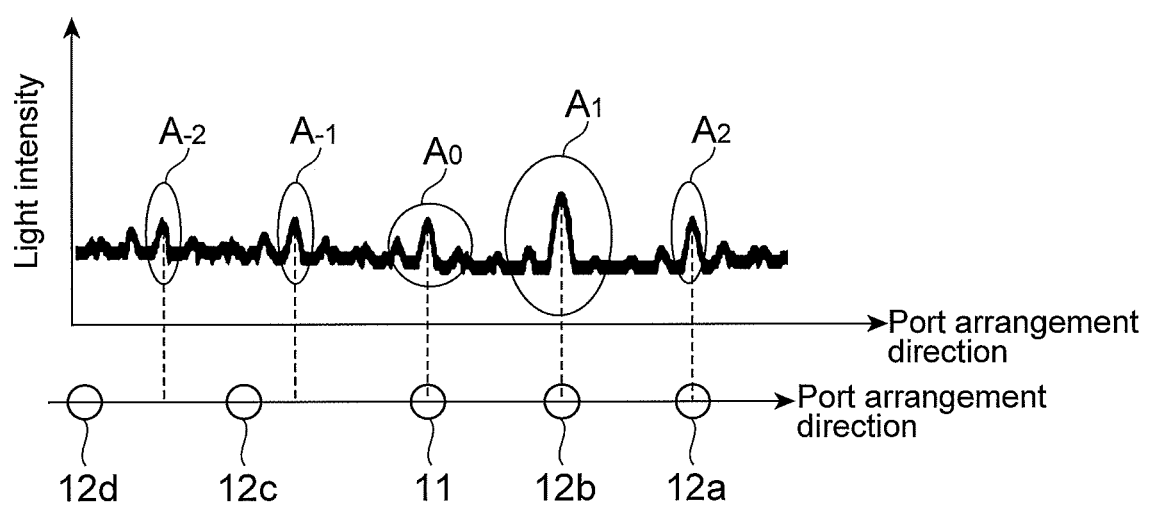
FIG. 11 is a diagram illustrating a relationship between a light input and output unit illustrated in FIG. 10 and a light intensity distribution of a diffracted light arriving at the light input and output unit.

FIG. 11 is a diagram illustrating a relationship between the light input and output part 18 illustrated in FIG. 10 and a light intensity distribution of diffracted light which has arrived at the light input and output part 18. An optical axis position of the $1^{st}$ order light $A_1$ having a highest peak of the light intensity in the port arrangement direction matches a position of the desired output port 12b (the second port) in the port arrangement direction, as illustrated in FIG. 11. On the other hand, the optical axis positions of the $-1^{st}$ order light $A_{-1}$ and the $-2^{nd}$ order light $A_{-2}$ in the port arrangement direction deviate from the positions of the other output ports 12c and 12d (the third port) in the port arrangement direction. Therefore, the $1^{st}$ order light $A_1$ can be preferably incident on the desired output port 12b (the second port). Further, it is possible to prevent the $-1^{st}$ order light $A_{-1}$ and the $-2^{nd}$ order light $A_{-2}$ from being incident on the other output ports 12c and 12d (the third port). Or, it is possible to reduce an incident light amount of the $-1^{st}$ order light $A_{-1}$ and the $-2^{nd}$ order light $A_{-2}$ incident on the other output ports 12c to 12d (the third port).

Further, in FIG. 11, a state in which a position of the $2^{nd}$ order light $A_2$ is generated and the position of the output port 12a are matched is illustrated for convenience. However, it is possible to increase the precision of the pattern of the diffraction grating shape since the phase difference between the pixels of the phase modulation pattern decreases when the inclination angle $\theta_1$ of the $1^{st}$ order light $A_1$ is small. Therefore, it is possible to reduce the intensity of the $2^{nd}$ order light $A_2$ such that the intensity can be neglected. On the other hand, when the inclination angle $\theta_1$ of the $1^{st}$ order light A1 is great, the optical axis of the $2^{nd}$ order light $A_2$ deviates from the light input and output part 18. Therefore, when the light intensity of the $-1^{st}$ order light $A_{-1}$ is problematic as noise due to the great inclination angle $\theta_1$ of the $1^{st}$ order light $A_1$, the $2^{nd}$ order light $A_2$ does not easily become noise. In other words, it is possible to preferably suppress the incidence of high order diffracted lights generated on the phase modulation element 17 on the third port by preventing the incidence of the $-1^{st}$ order light $A_{-1}$ on the output port.

Further, in the wavelength selective switch 1A of this embodiment, since the light from the input port 11 is perpendicularly incident on the modulation surface 17a, the zero order light $A_0$ is reflected to the input port 11, as illustrated in FIG. 10. In such a case, an isolator 19 may be provided in the input port 11. Accordingly, it is possible to effectively remove the zero order light $A_0$ incident on the input port 11. Alternatively, a phase modulation pattern for cancelling the zero order light $A_0$ may further be presented on the diffraction-grating-shaped phase modulation pattern presented by the modulation surface 17a. Accordingly, it is possible to reduce the light amount of the zero order light $A_0$ and effectively prevent the incidence of the zero order light $A_0$ on the input port 11. Or, it is possible to reduce the incident light amount of the zero order light $A_0$ incident on the input port 11. Alternatively, the input port 11 may be arranged to be spaced from the optical axis of the condensing lens 16. Accordingly, it is possible to preferably prevent the incidence of the zero order light $A_0$ on the input port 11.

(First Modification)

Figure 12:
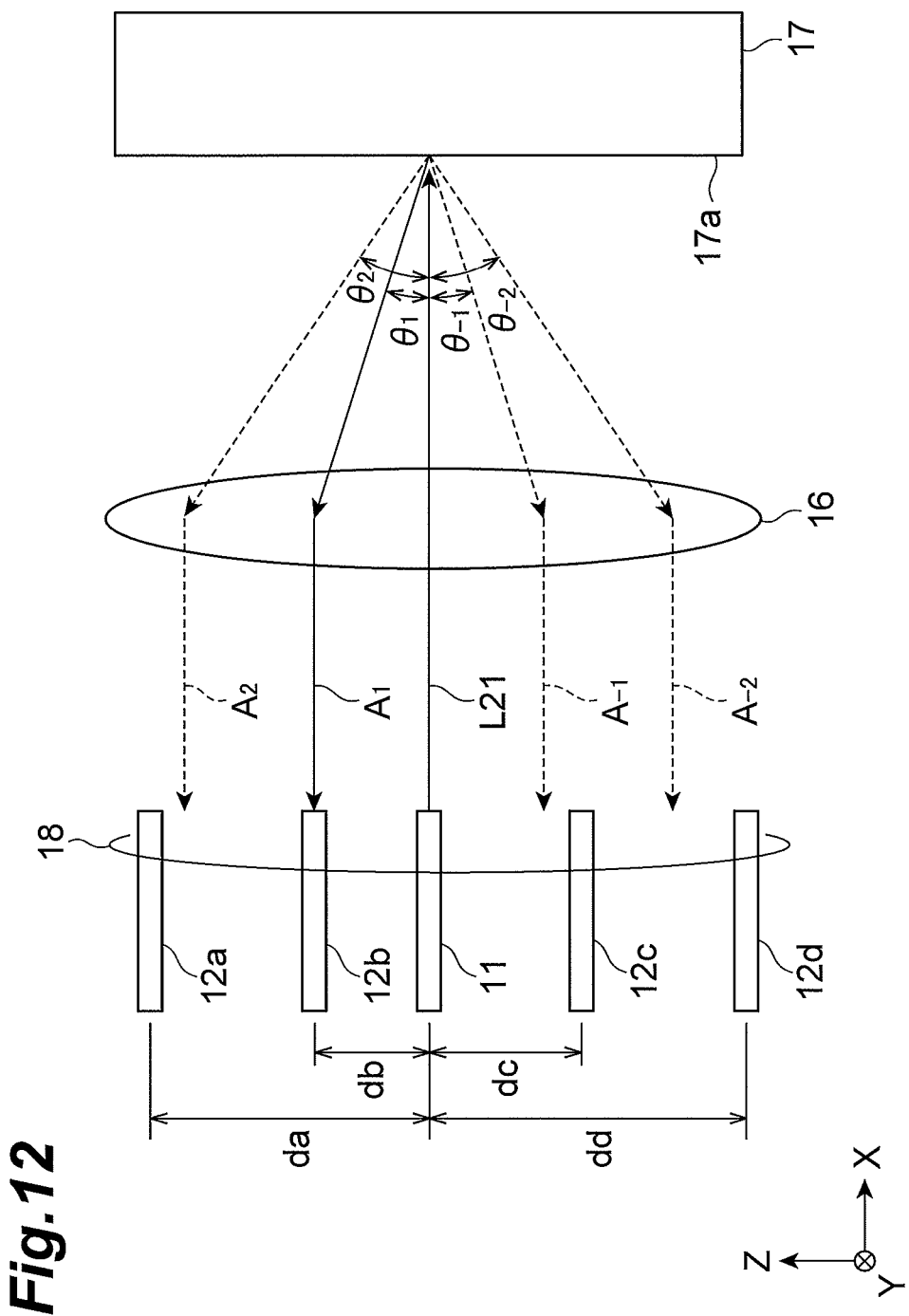
FIG. 12 is a diagram illustrating a relative arrangement of the light input/output port in a first modification.

FIG. 12 is a diagram illustrating a relative arrangement of the input port 11 and the plurality of output ports 12a to 12d in a first modification of the embodiment. In this example, the output port 12a is spaced from an optical axis of the $2^{nd}$ order light $A_2$, and the $2^{nd}$ order light $A_2$ is not incident on the output port 12a. Thus, it is preferable for the output port also to be spaced from the optical axis of the positive higher order light.

Such a form can be preferably realized, for example, when a ratio of distances da to dd between the optical axis of the zero order light $A_0$ and the respective output ports 12a to 12d is relatively prime (has no integral submultiples other than 1 and itself). With this port arrangement, it is possible to preferably prevent the lights (the $-1^{st}$ order light $A_{-1}$, the $2^{nd}$ order light $A_2$, the $-2^{nd}$ order light $A_{-2}$ and other higher order lights) other than the $1^{st}$ order light $A_1$ in any of the wavelength components L21 to L23 from being incident on the output ports 12a to 12d. Alternatively, it is possible to reduce an incident light amount of the lights other than the $1^{st}$ order light $A_1$ incident on the output ports 12a to 12d.

(Second Modification)

In the embodiment described above, a form in which the light L1 is input to the input port 11, and the respective wavelength components L21 to L23 are selectively output from the plurality of output ports 12a to 12d has been described. However, an effect of the prevention of the incidence of the $-1^{st}$ order light (more preferably, including higher order lights such as the $2^{nd}$ order light or the $-2^{nd}$ order light) on the output ports 12a to 12d can similarly be obtained in a form in which a plurality of wavelength components are input to the plurality of respective output ports 12a to 12d, combined, and output from the input port 11. Hereinafter, such a form will be described in detail. Further, in the following description of this modification, the port 11 is referred to as an output port and the ports 12a to 12d are referred to as input ports. Further, in this modification, the input port 12c may be referred to as a first port, the output port 11 may be referred to as a second port, and the input ports 12a, 12b and 12d other than the first port may be referred to as a third port.

Figure 13:
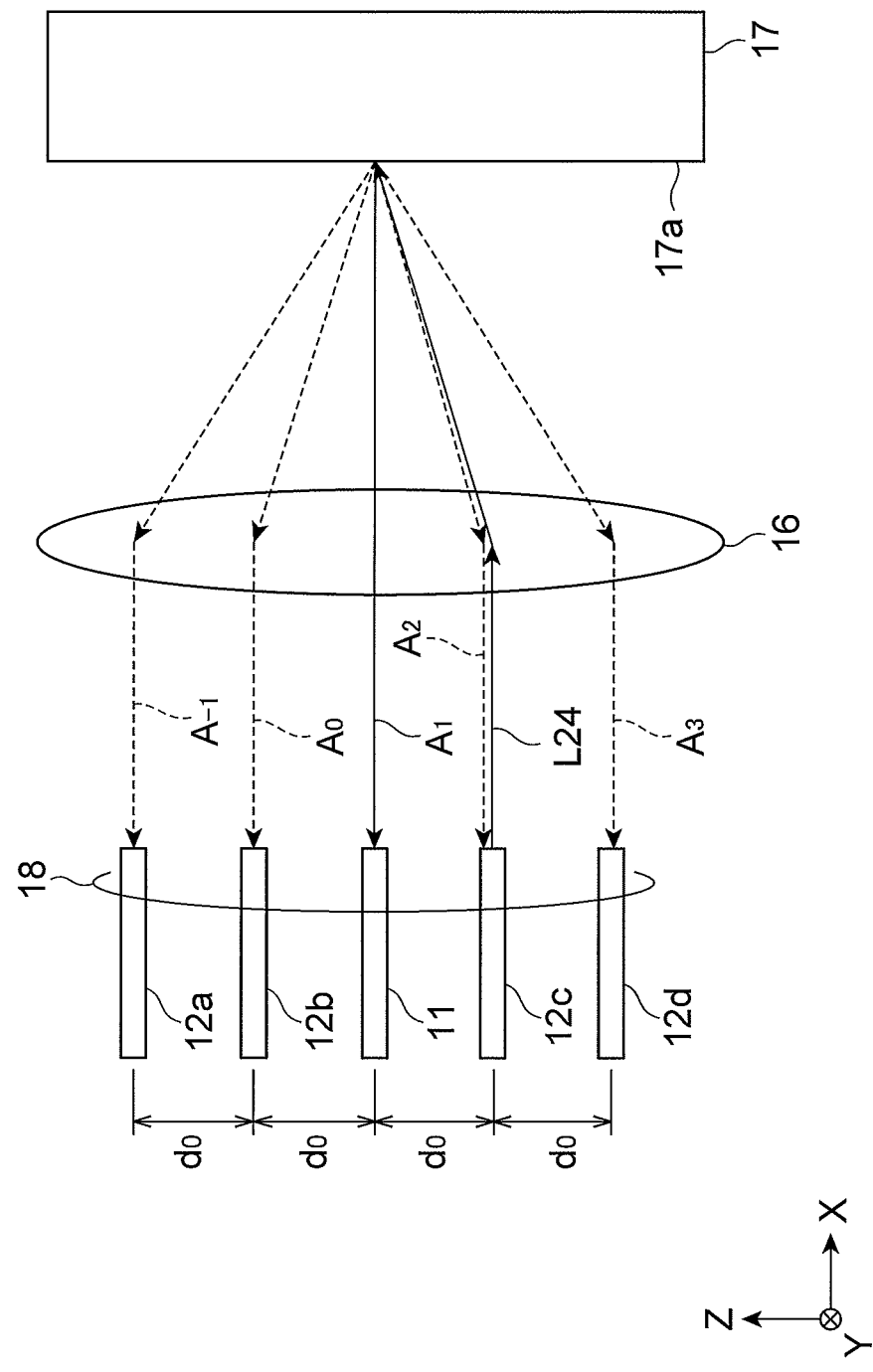
FIG. 13 is a diagram schematically illustrating a port arrangement in the wavelength selective switch in a comparative example of a second modification.

FIG. 13 is a diagram schematically illustrating a light input and output part 18 (see FIG. 9) in a wavelength selective switch in a comparative example. Here, an output port 11 and input ports 12a to 12d are arranged at equal distances (distance $d_0$). In such a configuration, a case in which a wavelength component L24 output from the input port 12c (the first port) is incident on the output port 11 (the second port) is considered. In this case, a $1^{st}$ order light $A_1$ in the diffracted light of the wavelength component L24 output from the modulation surface 17a of the phase modulation element 17 is incident on the output port 11. Also, in this case, a $-1^{st}$ order light $A_{-1}$, a zero order light $A_0$, a $2^{nd}$ order light $A_2$ and a $3^{rd}$ order light $A_3$ are generated.

In this modification, passage points of the respective orders of lights in the condensing lens 16 are at equal distances. Also, the distances are maintained up to the light input and output part 18. Therefore, arrival positions of the respective orders of lights arriving at the light input and output part 18 are also at equal distances, as illustrated in FIG. 13. Thus, if the output port 11 and the input ports 12a to 12d are arranged at equal distances (distances $d_0$) and the wavelength component L24 from the input port 12c is incident on the output port 11, the $-1^{st}$ order light $A_{-1}$ is incident on the input port 12a, and the zero order light $A_0$ is incident on the input port 12b.

Figure 14:
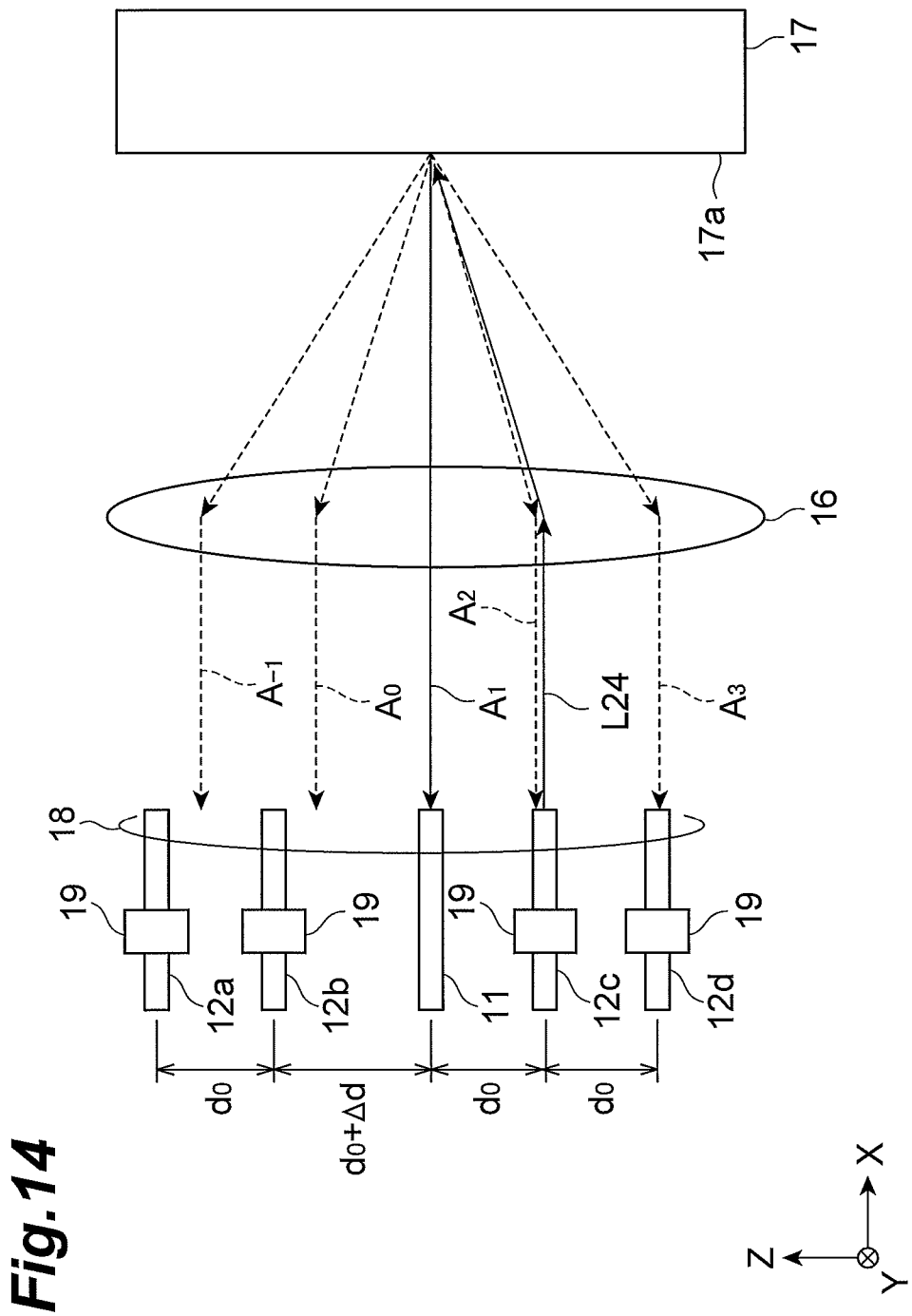
FIG. 14 is a diagram illustrating a relative arrangement of a light input/output port in the second modification.

Therefore, in this embodiment, distances between the output port 11 and the input ports 12a to 12d are set as illustrated in FIG. 14. In other words, the distance of the output port 11 and the input port 12c is set so that the output port 11 is arranged on an optical axis of the $1^{st}$ order light $A_1$. Accordingly, the $1^{st}$ order light $A_1$ is incident on the output port 11 (the second port). Meanwhile, distances of the plurality of input ports 12a to 12d are set so that central axes of the plurality of input ports 12a to 12d (the first port and the third port) are spaced from the optical axis of the $-1^{st}$ order light $A_{-1}$. Accordingly, the $-1^{st}$ order light $A_{-1}$ can be prevented from being incident on the input ports 12a to 12d (the first port and the third port). Or, it is possible to reduce an incident light amount of the $-1^{st}$ order light $A_{-1}$ incident on the input ports 12a to 12d (the first port and the third port).

Further, the central axes of the plurality of input ports 12a to 12d and the optical axis of the $-1^{st}$ order light $A_{-1}$ being spaced from each other refers to, for example, the fact that the central axes are spaced from the optical axis so that a light intensity of the $-1^{st}$ order light $A_{-1}$ incident on the input ports 12a to 12d is less than −30 dB based on a light intensity (a maximum coupling intensity) of the $1^{st}$ order light $A_1$ incident on the output port 11.

Further, in this modification, it is more preferable for the distance between the plurality of input ports 12a to 12d to be set so that the central axes of the plurality of input ports 12a to 12d (the first port and the third port) are spaced from the optical axis of the zero order light $A_0$. Accordingly, it is possible to prevent the zero order light $A_0$ from being incident on the input ports 12a to 12d. Or, it is possible to reduce an incident light amount of the zero order light $A_0$ incident on the input ports 12a to 12d.

In one embodiment, one portion of the light input and output part 18 (the input ports 12c and 12d) and a remaining portion of the light input and output part 18 (the input ports 12a and 12b) arranged with the optical axis of the $1^{st}$ order light $A_1$ interposed therebetween may be arranged to be asymmetrical to each other with respect to the optical axis of the $1^{st}$ order light $A_1$. Accordingly, it is possible to preferably prevent the $-1^{st}$ order light $A_{-1}$ and the zero order light $A_0$ from being incident on the input ports 12a to 12d (the first port and the third port). Such a form is preferably realized in such a manner that the light input/output ports of the remaining portion of the light input and output part 18 (the input ports 12a and 12b) are uniformly spaced by a distance $\Delta d$ from the positions symmetrical to the one portion of the light input and output part 18 (the input ports 12c and 12d) with respect to the optical axis of the $1^{st}$ order light $A_1$, for example, as illustrated in FIG. 14.

Further, in this modification, the $2^{nd}$ order light $A_2$ is reflected to the input ports which have output certain wavelength components, as illustrated in FIG. 14. Therefore, it is preferable for an isolator 19 to be provided in the input ports 12a to 12d. Accordingly, it is possible to effectively remove the $2^{nd}$ order light $A_2$ incident on the input ports 12a to 12d. Or, a phase modulation pattern for cancelling the $2^{nd}$ order light $A_2$ may overlap the diffraction-grating-shaped phase modulation pattern presented by the modulation surface 17a. Accordingly, it is possible to reduce a light amount of the $2^{nd}$ order light $A_2$ and effectively prevent incidence of the $2^{nd}$ order light $A_2$ on the input ports 12a to 12d (the first port and the third port). Or, it is possible to reduce an incident light amount of the $2^{nd}$ order light $A_2$ incident on the input ports 12a to 12d (the first port and the third port).

(Third Modification)

Figure 15:
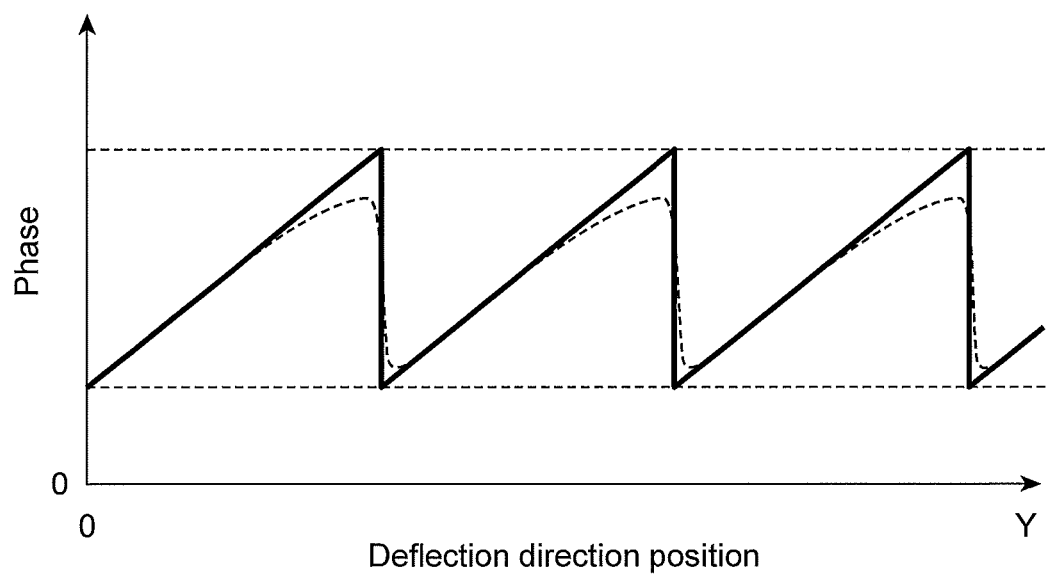
FIG. 15 is a graph illustrating a phase modulation pattern presented by a phase modulation element.

FIG. 15 is a graph illustrating a phase modulation pattern presented by the phase modulation element 17. In the phase modulation element 17, even when a control voltage presenting a diffraction-grating-shaped phase modulation pattern as indicated by a solid line in FIG. 15 is applied, the phase modulation pattern may be distorted as indicated by a dashed line in FIG. 15 under an influence of electronic crosstalk between pixels. Such crosstalk becomes remarkable as a phase difference between adjacent pixels is greater. Therefore, in the wavelength selective switch 1A of the embodiment described above, it is preferable for the input port closed to an edge of the light input and output part 18 (i.e., farther from the output port 11) to be arranged apart from the optical axis of the $-1^{st}$ order light $A_{-1}$. For example, it is possible to preferably realize such a form by the distances between the output port 11 and the respective input ports 12a to 12d being set to gradually increase or gradually decrease as the distance from the optical axis of the zero order light $A_0$ increases.

(Fourth Modification)

Figure 16:
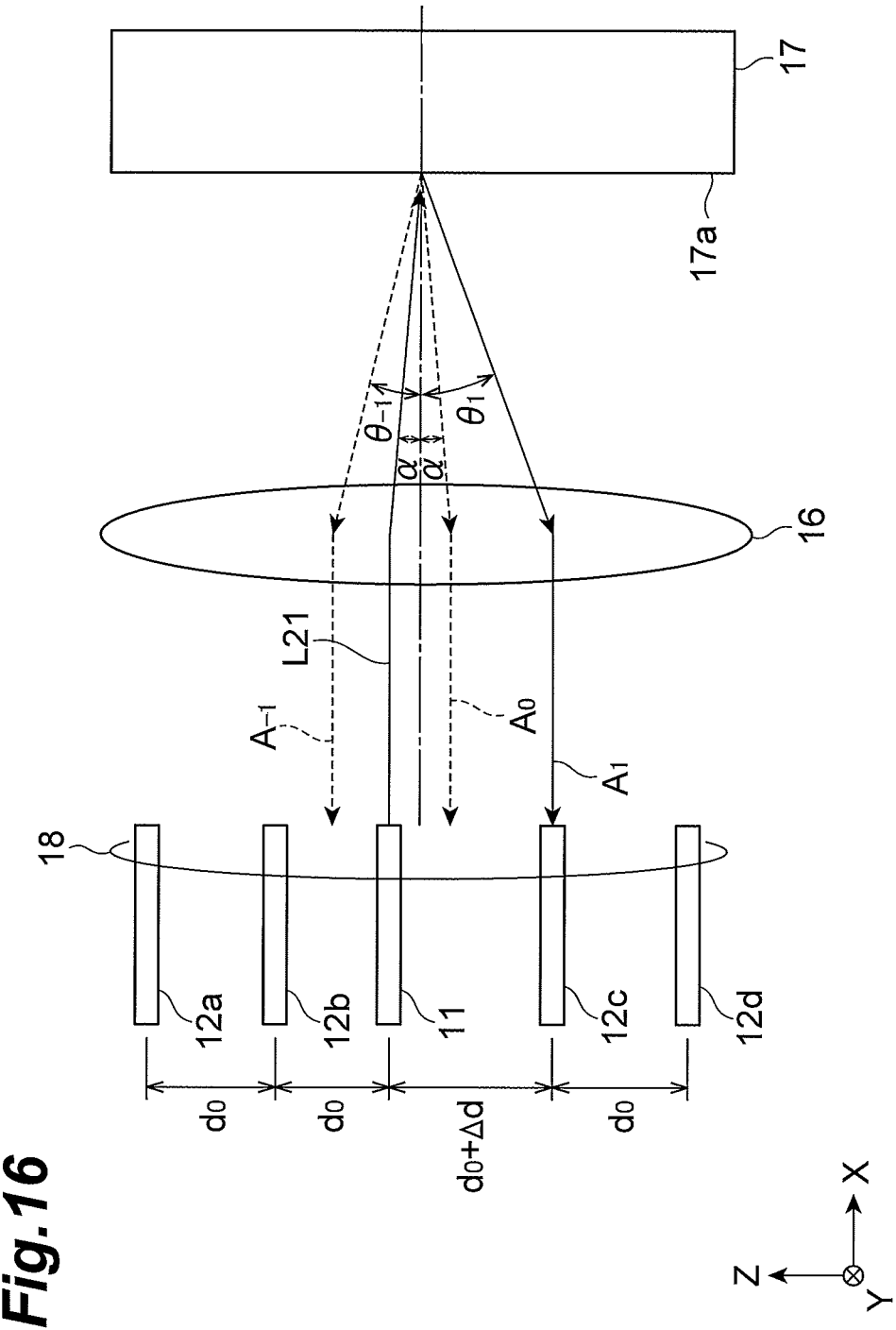
FIG. 16 is a diagram illustrating a relative arrangement of a light input/output port in a fourth modification.

FIG. 16 is a diagram illustrating a relative arrangement of the input port 11 and the plurality of output ports 12a to 12d in a fourth modification of the embodiment described above. In this example, as the input port 11 is arranged to be offset in the X-axis direction from the optical axis of the condensing lens 16, coupling of the zero order light $A_0$ and the input port 11 is prevented. In such a case, the optical axis of each wavelength component (the wavelength component L21 is illustrated in FIG. 16) incident on the phase modulation surface 17a is inclined by an angle $\alpha$ with respect to a normal of the phase modulation surface 17a. In other words, an incident angle of each wavelength component with respect to the phase modulation surface 17a is $\alpha$ (>0).

When the optical axis of each wavelength component is inclined in this way, an inclination angle $\theta_n$ of the optical axis of the $n^{th}$ order light $A_n$ is expressed by Equation (3) below.

$$\theta_n = n \cdot n \cdot \theta_1 + \alpha \quad (3)$$

Therefore, a position coordinate $x_n$ of the passage point of the $n^{th}$ order light $A_n$ in the condensing lens 16 based on the central axis of the condensing lens 16 is $$x_n = L \cdot \sin(\theta_n) = L \cdot \sin(n \cdot \theta_1 + \alpha) \quad (4)$$
$$= L \cdot \sin(n \cdot \theta_1) + L \cdot \sin(\alpha)$$
$$\approx nL \cdot \sin(\theta_1) + L \cdot \sin(\alpha)$$

As seen from Equation (4), the position coordinate $x_n$ of the passage point of the $n^{th}$ order light $A_n$ is offset by a position shift amount $L \cdot \sin(\alpha)$ of the optical axis of the zero order light $A_0$ by the inclination in comparison with a case in which there is no inclination $\alpha$. Therefore, the positions of optical axes of the $-2^{nd}$ order light $A_{-2}$, the $-1^{st}$ order light $A_{-1}$, the $2^{nd}$ order light $A_2$ and the like may be determined by additionally using the position shift amount $L \cdot \sin(\alpha)$.

Further, in this modification, one portion of the light input and output part 18 (the output ports 12a and 12b) and a remaining portion of the light input and output part 18 (the output ports 12c and 12d) are arranged with the optical axis of the zero order light $A_0$ interposed therebetween. Also, it is preferable for the light input/output ports of the remaining portion of the light input and output part 18 (the output ports 12c and 12d) to be uniformly spaced by the position shift amount $L \cdot \sin(\alpha)$ from the positions symmetrical to the one portion of the light input and output part 18 (the output ports 12a and 12b) with respect to the optical axis of the zero order light $A_0$ (i.e., $\Delta d = 2L \cdot \sin(\alpha)$ in FIG. 16), and then arranged at equal distances $d_0$. Further, in this case, it is more preferable for the incidence angle $\alpha$ and a port distance of the light input and output part 18 to be set so that the position shift amount $L \cdot \sin(\alpha)$ is ½ of the distance $d_0$. Accordingly, since the $-1^{st}$ order light $A_{-1}$ arrives at a middle position of the adjacent input ports, coupling between the $-1^{st}$ order light $A_{-1}$ and the input port can be greatly reduced.

Further, it is preferable for a distance between the central axis of the third port (in this modification, the output port 12b) closest to the optical axis of the zero order light $A_0$ and the optical axis of the zero order light $A_0$ to be substantially equal to the position shift amount $L \sin \alpha$. Accordingly, it is possible to minimize coupling to the input port when an operation is not performed.

The wavelength selective switch according to the present invention is not limited to the embodiments described above, and may be variously changed. For example, while the case in which the number of wavelength components after dispersion (or combined wavelength components) is 3 has been illustrated in the embodiment described above, the present invention can be preferably applied if the number of wavelength components after dispersion is 2 or more. Also, any number of input ports that is equal to or more than the number of wavelength components can be selected.

Further, while an LCOS has been illustrated as the phase modulation element in the embodiment described above, the phase modulation element applicable to the present invention is not limited thereto and various phase modulation elements capable of presenting the diffraction-grating-shaped phase modulation pattern may be adopted.

What is claimed is:

1. A wavelength selective switch, comprising:
   a light input and output part in which light input/output ports are arranged in a predetermined direction, the light input/output ports including a first port for inputting light, a second port for outputting the light, and at least one third port for inputting or outputting the light;
   a wavelength dispersive element optically coupled to the light input and output part; and
   a phase modulation element which includes a plurality of pixels performing phase modulation and diffractively deflects an optical path of the light arriving from the first port via the wavelength dispersive element by presenting a diffraction-grating-shaped phase modulation pattern,
   wherein the light input/output ports are arranged so that a $1^{st}$ order light of the light diffracted by the phase modulation element is incident on the second port, and the first port and the third port are spaced from an optical axis of a $-1^{st}$ order light of the light diffracted by the phase modulation element, and
   wherein a first plurality of the light input/output ports and a second plurality of the light input/output ports are arranged to be asymmetrical to each other with respect to an optical axis of a zero order light of the light diffracted by the phase modulation element.

2. The wavelength selective switch according to claim 1, wherein the second plurality of the light input/output ports are uniformly spaced from positions symmetrical to the first plurality of the light input/output ports with respect to the optical axis of the zero order light.

3. The wavelength selective switch according to claim 1, wherein a distance between the respective light input/output ports increases or decreases as a distance from the optical axis of a zero order light increases.

4. The wavelength selective switch according to claim 1, wherein an optical axis of the light incident on the phase modulation element is inclined with respect to a normal of the phase modulation element, and a position of the optical axis of the $-1^{st}$ order light is determined in view of the inclination.

5. The wavelength selective switch according to claim 1, wherein an isolator is provided in the first port or a phase modulation pattern for cancelling the zero order light of the light diffracted by the phase modulation element is further presented on the diffraction-grating-shaped phase modulation pattern.

6. The wavelength selective switch according to claim 1, wherein a relative light intensity of the $-1^{st}$ order light incident on the third port relative to a light intensity of the $1^{st}$ order light incident on the second port is less than $-30$ dB.

7. A wavelength selective switch, comprising:
   a light input and output part in which light input/output ports are arranged in a predetermined direction, the light input/output ports including a first port for inputting light, a second port for outputting the light, and at least one third port for inputting or outputting the light;
   a wavelength dispersive element optically coupled to the light input and output part; and
   a phase modulation element which includes a plurality of pixels performing phase modulation and diffractively deflects an optical path of the light arriving from the first port via the wavelength dispersive element by presenting a diffraction-grating-shaped phase modulation pattern,
   wherein the light input/output ports are arranged so that a $1^{st}$ order light of the light diffracted by the phase modulation element is incident on the second port, and the first port and the third port are spaced from an optical axis of a $-1^{st}$ order light of the light diffracted by the phase modulation element, and wherein a ratio of distances between an optical axis of a zero order light and the respective light input/output ports is relatively prime.

* * * * *